United States Patent [19]
Lazzarotti

[11] Patent Number: 5,860,504
[45] Date of Patent: *Jan. 19, 1999

[54] TRANSFER BUFFER AND INSERTER AND METHOD

[75] Inventor: S. James Lazzarotti, Broomall, Pa.

[73] Assignee: Lockheed Martin Corporation, Bethesda, Md.

[*] Notice: This patent issued on a continued prosecution application filed under 37 CFR 1.53(d), and is subject to the twenty year patent term provisions of 35 U.S.C. 154(a)(2).

[21] Appl. No.: 340,672

[22] Filed: Nov. 16, 1994

[51] Int. Cl.$^6$ ...................................................... B65G 47/10
[52] U.S. Cl. .................... 198/357; 198/349.6; 198/502.2
[58] Field of Search ..................................... 198/357, 358, 198/349.6, 370.01, 370.1, 444, 448, 460.1, 460.3, 502.2; 271/9.13, 176, 225

[56] References Cited

U.S. PATENT DOCUMENTS

| | | |
|---|---|---|
| 1,939,184 | 12/1933 | Neuman . |
| 1,990,549 | 2/1935 | Kimball . |
| 2,139,877 | 12/1938 | Brandt . |
| 2,756,553 | 7/1956 | Ferguson et al. . |
| 2,847,110 | 8/1958 | Rysti . |
| 2,920,738 | 1/1960 | Carter . |
| 2,961,085 | 11/1960 | Stovall . |
| 2,982,407 | 5/1961 | Craig et al. . |
| 3,034,665 | 5/1962 | Speaker . |
| 3,053,530 | 9/1962 | Peeters . |
| 3,069,011 | 12/1962 | Buchwald et al. . |
| 3,162,294 | 12/1964 | Dieter .................................. 198/460.3 |
| 3,187,878 | 6/1965 | W.G. Harrison et al. . |
| 3,223,225 | 12/1965 | Clark et al. . |
| 3,279,598 | 10/1966 | Barnard et al. . |
| 3,339,705 | 9/1967 | Burkhardt et al. . |
| 3,347,348 | 10/1967 | Flint et al. . |
| 3,440,974 | 4/1969 | Ruiz . |
| 3,467,238 | 9/1969 | Fry et al. . |
| 3,491,903 | 1/1970 | Hedrick et al. . |
| 3,536,180 | 10/1970 | Dubus . |
| 3,693,486 | 9/1972 | Maniaci et al. . |
| 3,731,787 | 5/1973 | Gregor . |
| 3,747,781 | 7/1973 | Daigle et al. . |
| 3,806,115 | 4/1974 | Wojtowicz et al. . |
| 3,814,415 | 6/1974 | Hunter et al. . |
| 3,817,516 | 6/1974 | Lazzarotti et al. . |
| 3,825,248 | 7/1974 | Friend . |
| 3,847,383 | 11/1974 | Wojtowicz et al. . |
| 3,884,370 | 5/1975 | Bradshaw et al. . |
| 3,927,876 | 12/1975 | Wojtowicz et al. . |
| 3,938,435 | 2/1976 | Suda et al. . |
| 4,136,780 | 1/1979 | Hunter et al. . |
| 4,149,622 | 4/1979 | Bradshaw et al. . |
| 4,150,743 | 4/1979 | Lazzarotti et al. . |

(List continued on next page.)

FOREIGN PATENT DOCUMENTS 61-124459  6/1986  Japan .

Primary Examiner—Joesph E. Valenza
Attorney, Agent, or Firm—Glenn W. Bowen

[57] ABSTRACT

Apparatus and method are provided for providing multiple loading sites or entry sites for a single conveyor belt. This apparatus and method is particularly adapted to handling of pieces of flat mail. For each such loading site, another conveyor belt feeds mail flats to a transfer-buffer station measuring their sizes in the process. The feeder belt does not place a mail flat in the transfer-buffer station unless that station is sensed to be empty. The transfer-buffer station provides individual mail flats, one at a time, to an inclined conveyor belt, which serves as an inserter belt system. After a mail flat is moved by the transfer-buffer station onto the inserter belt system, the inserter belt system moves the mail flat to an intermediate "ready-to-load" park position and then stops. When a gap appears on the main conveyor belt, the inserter belt moves the mail flat onto that gap. Multiple such insertion devices permit parallel loading of mail pieces onto a single conveyor belt, increasing packing density on that belt and permitting use of lower operating speeds to improve performance without sacrificing total throughput.

11 Claims, 6 Drawing Sheets

U.S. PATENT DOCUMENTS

| | | |
|---|---|---|
| 4,161,244 | 7/1979 | Hunter et al. . |
| 4,168,133 | 9/1979 | Burkhardt ............................... 198/357 |
| 4,227,607 | 10/1980 | Malavenda . |
| 4,244,672 | 1/1981 | Lund . |
| 4,307,293 | 12/1981 | Lazzarotti et al. . |
| 4,328,962 | 5/1982 | Akers . |
| 4,431,104 | 2/1984 | Orlowski et al. . |
| 4,593,806 | 6/1986 | Tappe et al. . |
| 4,606,660 | 8/1986 | Bradshaw et al. . |
| 4,697,689 | 10/1987 | Carrell . |
| 4,724,946 | 2/1988 | Cinotti . |
| 4,756,521 | 7/1988 | Martin . |
| 4,915,209 | 4/1990 | Canziani . |
| 5,038,911 | 8/1991 | Doane et al. ............................ 198/357 |
| 5,050,743 | 9/1991 | Lazzarotti . |
| 5,069,440 | 12/1991 | Lazzarotti et al. . |

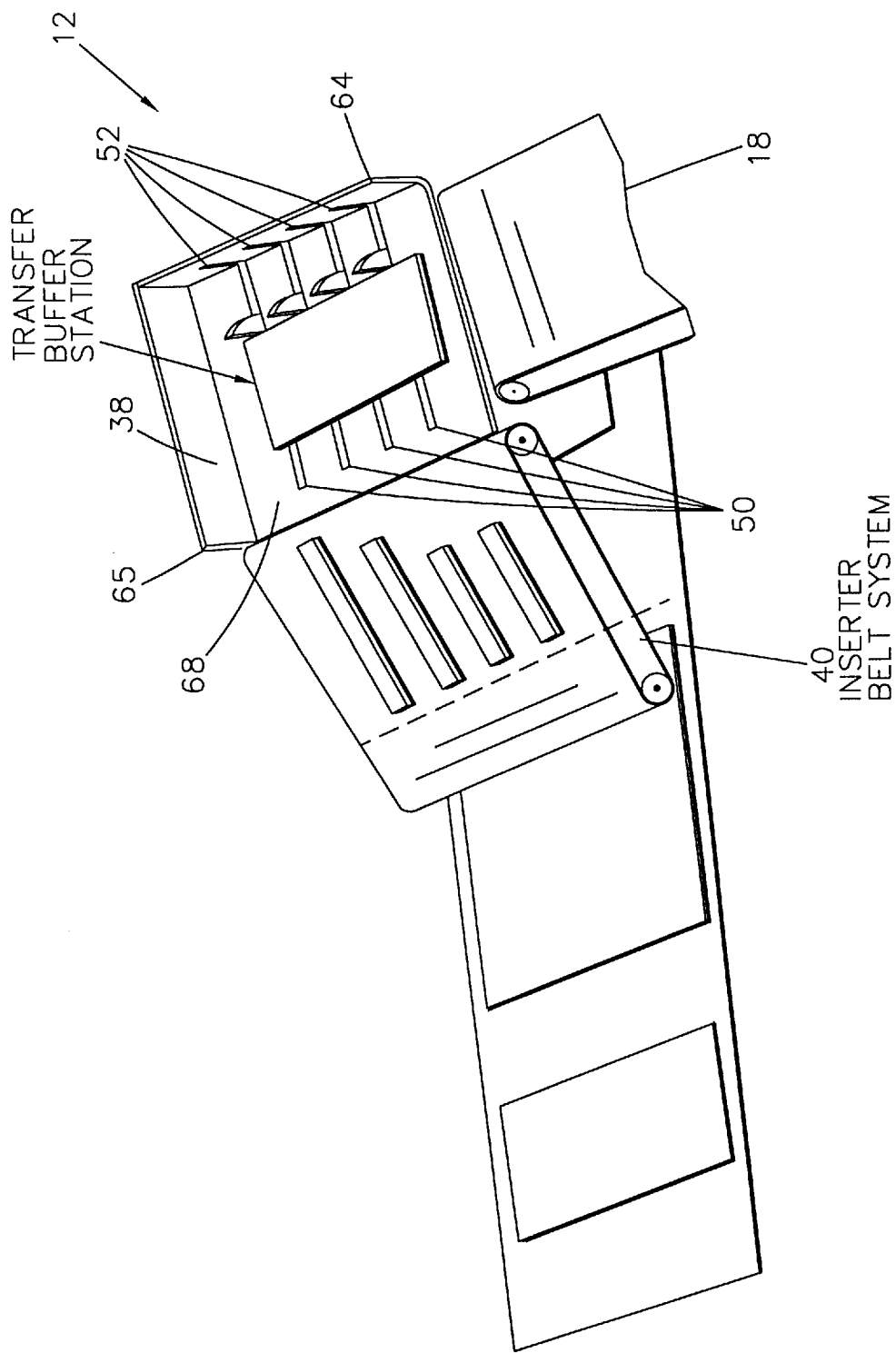

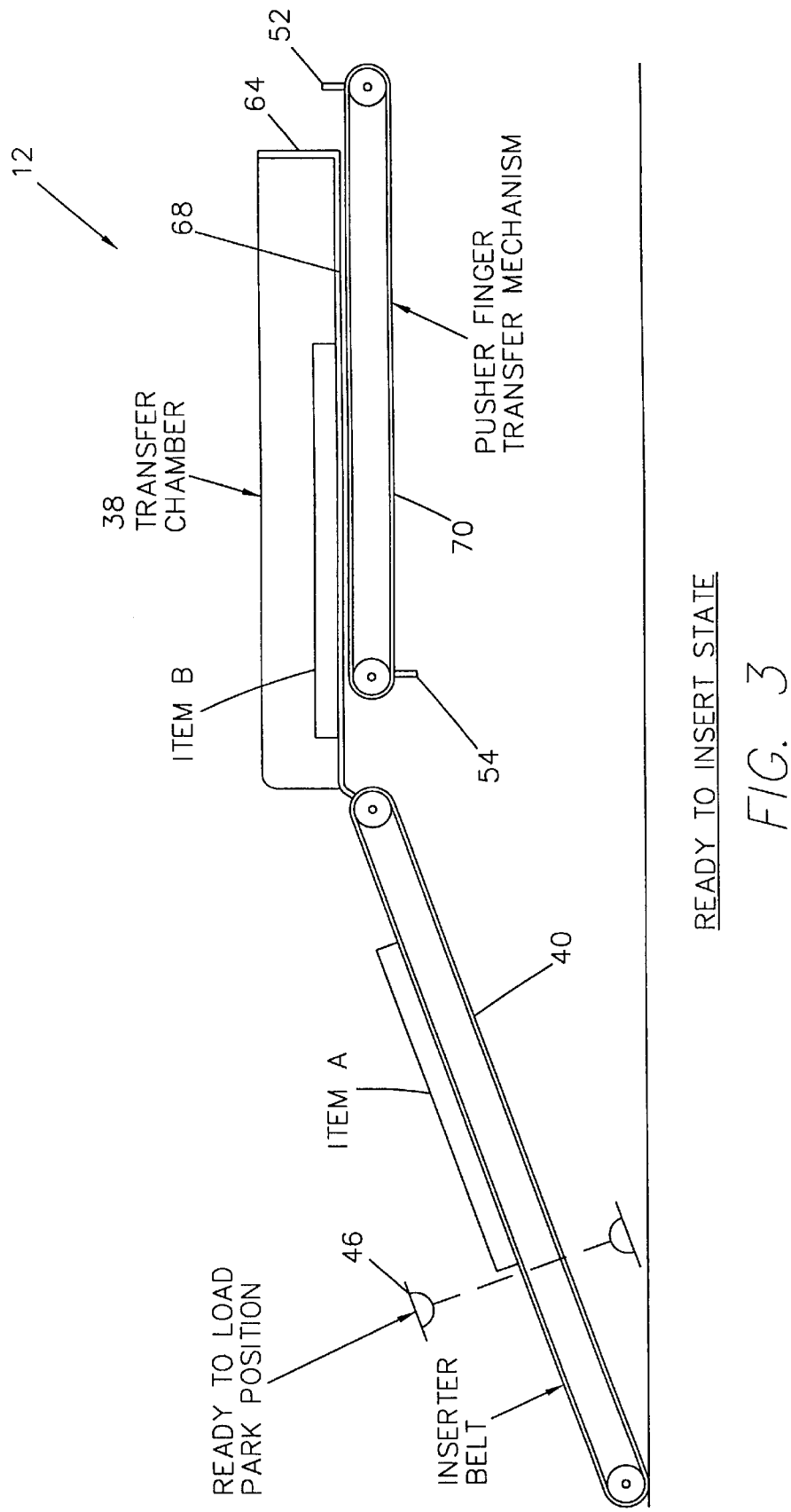

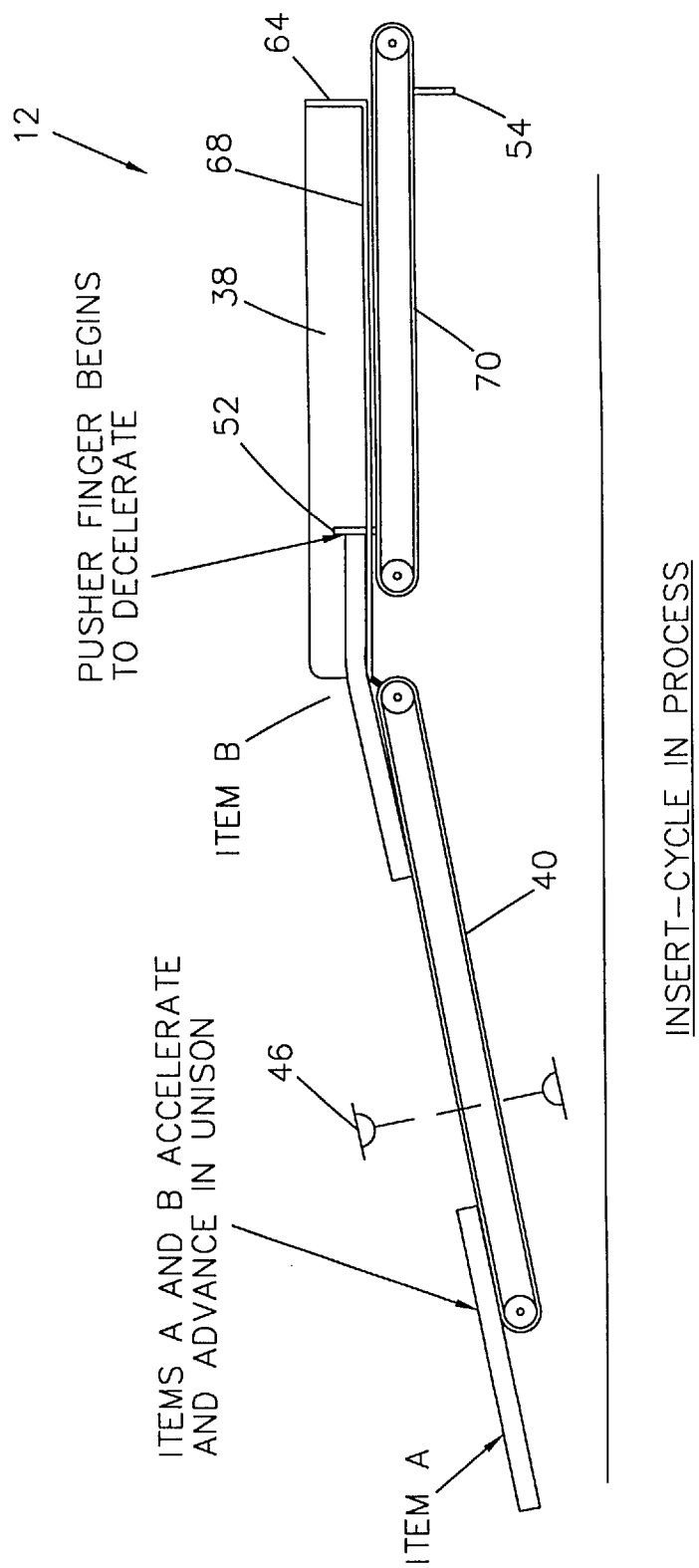

INSERT-CYCLE FINAL PHASE

TRANSFER BUFFER AND INSERTER AND METHOD

FIELD OF THE INVENTION

The present invention relates to feeding or delivering of articles such as envelopes, and more particularly to feeding of same by means to change direction of article travel, and to delivering with transfer means between conveyor and receiver. The present invention also relates to feeding or delivering of articles such as envelopes, and more particularly to delivering such articles with means to change the orientation or direction of such articles during delivery. The present invention further relates to power-driven conveyors, and more particularly to a conveyor system for moving a group of items by depositing items successively from one or more conveyors onto another conveyor. The present invention still further relates to power-driven conveyors, and more particularly to conveyor systems for arranging or rearranging stream(s) of items by queuing items from quantity sources of such items into one or more streams of such items, and by merging such stream(s) into one stream.

BACKGROUND OF THE INVENTION

There exist applications in which there is a need to provide for high density loading of non-uniformly sized items on a conveyor belt, especially from multiple input sources. The present invention fulfills that need.

In general, flat mail (also referred to as flats or mail flats) includes mail pieces from 3½ inches by 5 inches to 15 inches by 15 inches, with thickness up to one inch and weight up to three pounds. When articles such as mail flats are to be deposited on a conveyor belt from multiple input sources, increasing the speed of the input belts and the speed of the receiving conveyor may increase throughput, but at the expense of an increased likelihood of item jams and other reliability and performance problems. Such problems are exacerbated when two or more source streams are to be loaded and merged onto a single conveyor at higher moving velocities. U.S. Pat. No. 3,491,903 issued Jan. 27, 1970 for "Induction Scheme and Automatic Loader" by R. R. Hedrick et al., U.S. Pat. No. 3,536,180 issued Oct. 27, 1970 for "Device for Collecting and Distributing Objects from a Plurality of Partial Streams" by G. Dubus, U.S. Pat. No. 3,693,486 issued Sep. 26, 1972 for "Conveyer System" by P. J. Maniaci et al., and U.S. Pat. No. 4,915,209 issued Apr. 10, 1990 for "Method for Controlling the Exact Positioning of the Items to be Sorted in an Automatic Sorting Plant" by F. Canziani attempt to provide loading or merging of items onto a single conveyor from multiple sources of input. However, none of these patents appear to be capable of performing high density loading when non-uniform sizes of items are being processed. It is therefore preferable to increase throughput by utilizing the full loading surface of (increasing the density of loading onto) the receiving conveyor, while maintaining only a minimal separation between the items being loaded to avoid jamming problems and the like. The present invention fulfills this need while avoiding unnecessary increases in transport speed.

SUMMARY OF THE INVENTION

Accordingly, an object of the present invention is to provide apparatus and method for loading one or more streams of items onto a moving conveyor or the like.

Another object of the present invention is to provide apparatus and method for providing a high density loading of items on distribution conveyors while minimizing transport velocities and improving overall system performance, reliability and maintainability.

A further object of the present invention is to provide apparatus and method for handling of items in a manner to improve productivity and overall performance.

Still another object of the present invention is to provide apparatus and method for receiving and positioning individual articles in preparation for precise insertion onto available and vacant "slots" of (or locations on) a moving conveyor system.

A still further object of the present invention is to maximize the packing density of articles being loaded on a transport conveyor, and to fully utilize all of the available space allocated on the conveyor for transporting such articles, thereby permitting the equipment to be operated at lower speeds without sacrificing throughput performance but with the benefit of improved operating productivity.

Briefly, these and other objects of the present invention are provided by apparatus and method in which one or more loading sites or entry sites are provided for a single conveyor belt. For each such loading site, another conveyor belt provides articles to a transfer-buffer station. Each such additional belt does not place an article on the transfer-buffer station unless that station is empty. Each transfer-buffer station provides individual articles, one at a time, to an inclined conveyor belt. After an article is moved by the transfer-buffer station onto the inclined belt, the latter moves the article to an intermediate "ready-to-load" park position and then stops. When a gap or vacancy (such as a pre-allocated space assignment) appears on the main conveyor belt, the inclined belt moves the article onto that gap or vacancy. Multiple such loading devices permit parallel loading of articles onto a common (i.e. a single) conveyor belt, increasing packing density on the belt and permitting use of lower operating speeds without sacrificing throughput.

Other objects, advantages and novel features of the invention will become apparent from the following detailed description of the invention when considered in conjunction with the accompanying drawings.

BRIEF DESCRIPTION OF THE DRAWINGS

In the drawings,

FIG. 2 illustrates an insertion mechanism of FIG. 1 in greater detail; and

FIGS. 3, 4 and 5 are side views of the same portion of the mechanism of FIG. 2, illustrating three different, successive stages of a transfer-insertion sequence for provision of one or more articles by the mechanism of FIG. 2 to the distribution conveyor belt of FIG. 1.

DESCRIPTION OF THE PREFERRED EMBODIMENT

Figure 1:
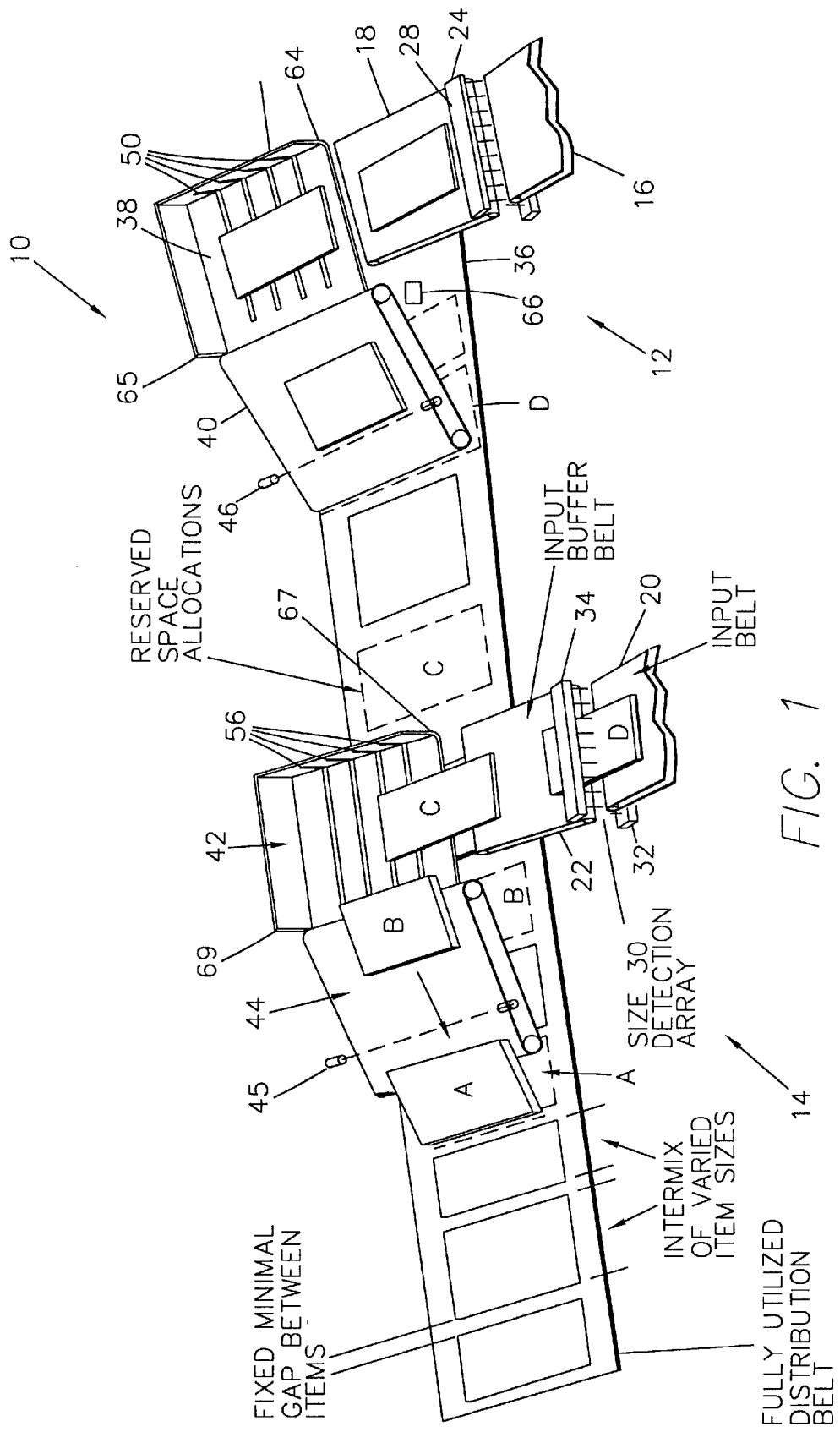
FIG. 1 shows one embodiment of a multiple station buffer-inserter system according to the present invention.

Referring now to the drawings, wherein like reference characters designate like or corresponding parts throughout the several views, there is shown in FIG. 1 a two station buffer-inserter system 10 including a first buffer and insertion station 12 and a similar or identical second buffer and insertion station 14. Although only two such stations 12 and 14 are shown in FIG. 1, it should be understood that the present invention can be practiced with any number of such stations. Although in FIGS. 2–5 details of station 12 are referred to, it should be understood that these details also apply to station 14 and to any other station that might be used in system 10. As shown in FIG. 1, station 12 is fed by input belts 16 and 18, while station 14 is fed by input belts 20 and 22. Processing non-uniform sizes of items requires size measurement of incoming items as they are in process, and utilizes a built-in control system which dynamically allocates and reserves space allowances on the receiving conveyor 36 for each incoming item. This, coupled with the ability to precisely deposit the item in its assigned space, ensures maximum utilization of the receiving conveyor 36 by maintaining a pre-established minimum gap space between items, and limits its transport velocity to its lowest possible level. Disposed between input belts 16 and 18 is a row array of photocells 24 including photoemitters 26 and corresponding photodetectors 28. Likewise, disposed between input belts 20 and 22 is a row array of photocells 30 including a plurality of photoemitters 32 and a like plurality of correspondingly positioned photodetectors 34. In FIG. 1 the photoemitters are shown disposed below the corresponding photodetectors, which are more easily blocked by dust. However, the present invention will also work if that arrangement is reversed or inverted, with the photodetectors disposed below the corresponding photoemitters, which would then shine upwards instead of downwards. Array 24 measures the length or size of an article in one direction, which will be the direction of its insertion onto conveyor belt 36. Likewise, photocell array 30 determines the length or size of an article in one dimension or direction, which will be the direction of its insertion onto conveyor belt 36. In FIG. 1, articles A, B, C and D are shown in system 10 at different stages of operation. Station 12 includes a buffer transfer compartment 38 and an inclined inserter belt 40 for inserting items onto belt 36. Likewise, station 14 includes a buffer transfer compartment 42 and an inclined inserter belt 44 for inserting articles onto conveyor belt 36. Disposed on belt 40 is a photoemitter-photodetector pair 46 for sensing when an article is at the parked or ready-to-load position on belt 40. Likewise, belt 44 is provided with a photoemitter-photodetector pair 48 positioned for detecting whether an article is at the parked or ready-to-load position on belt 44. Compartment 38 is provided with a plurality of parallel slots or openings 50 configured to accommodate a plurality of pusher fingers or extensions 52 and preferably at least another plurality of pusher fingers or extensions 54. Likewise, compartment 42 is provided with a plurality of parallel slots 56, oriented in the intended direction of movement of an article from compartment 42 onto belt 44, and configured to accommodate a first plurality of pusher fingers or extensions 52 and preferably at least a second plurality of pusher fingers or extensions 54.

One very important objective in postal mail handling is to maximize productivity and to maintain high overall performance levels. System 10 meets these goals by providing a high density loading of items on a distribution conveyor 36 while minimizing transport velocities and improving overall system performance, reliability and maintainability.

System 10 as illustrated in FIG. 1 includes two (or more) input lanes 16 and 20 which respectively deliver mail pieces from upstream sources (not shown) to separate buffer-inserter transfer stations 12 and 14. Each such station 12 and 14 contains an input belt 16 for delivery of mail from upstream processing sources, a respective array of photocells 24 or 30 used to measure the size of each mail piece entering a buffer system 12 or 14, a respective transfer compartment 38 or 42 having the capability of redirecting the advance of each mail piece, and a respective inserter belt 40 or 44 which performs the actual insertion task upon generation of a command signal. Controller 62 receives inputs from sensor arrays 24, 30, 46 and 48, and in response to same controls operation of compartments 38 and 42 and belts 16, 18, 20, 22, 40 and 44. Conveyor 36 in contrast is intended to run continuously at a generally uniform velocity.

Mail is delivered to each of two (or more) buffer-inserter transfer stations 12 and 14 via independent upstream input conveyor transport belts 16 and 18 or 20 and 22 respectively. As items are introduced into each such station 12 or 14, they move past a respective array 24 or 30 of photodetectors which measure the width of each item entering the station. Each such array 24 and 30 is positioned upstream of its corresponding buffer-inserter transfer station 12 or 14 so that a sufficient buffer store of measured items exists and are arranged sequentially in a line-up order, ready for loading onto the distribution conveyor 36. This is necessary in order to establish item measurements to be used at downstream insertion station 14 (and any other downstream insertion stations), and to direct the upstream insertion station 12 to reserve adequate space allocations on the distribution conveyor 36 during the insertion process of station 12. This is explained in more detail in the following paragraphs.

In a two input system 10, the upstream transfer station 12 operates in a manner that allocates a vacant space provision after each of its insertion cycles to accommodate insertion from downstream inserter(s) 44, etc. As explained in the immediately preceding paragraph, the size of each such vacancy is based on information which is received from the sensor array 30 of downstream inserter station 14. The newly created vacancy on conveyer 36 advances toward the downstream inserter 44 and at the appropriate time, a command from controller 62 instructs the inserter mechanism 44 to deposit the item onto the conveyor 36.

Since the objective of the system 10 is to maximize utilization of space on the distribution conveyor 36, controller 62 preferably creates the smallest vacancy allocation necessary based on the needs of station 14. For example, assuming the width of mailpiece items ranges from 5" to 15", then the smallest space allocation would be programmed to be 5", even when no mail is available in station 14. However, when an incoming item in station 14 is measured by sensor array 30 to be greater than 5" in width, its size is relayed to controller 62 so that it may apply an appropriate time delay on station 12 for station 12's next insertion cycle. This delay ensures the proper allocation of space for the downstream insertion from station 14 while maintaining full utilization of distribution conveyor 36 available space.

To provide maximum throughput efficiency in a small flat sorting machine or the like, high density loading of its sort distribution conveyor (which can be conveyor 36) is an important consideration. The insertion mechanism shown in FIG. 2 provides this capability. As shown, this mechanism is based on a belt 36 loading philosophy which employs two or more (for example, four) individual insertion positions per load belt 36. Each such insertion position is identical to that which is illustrated in FIG. 2.

As shown in FIG. 2, mail pieces entering transfer station 12 are conveyed by the upstream input belts 16, 18. As the item leaves belts 16, 18 and enters compartment 38, belts 16 and 18 lose their control over the advancement of the item. The item can then decelerate and gently come to rest on transfer bed 68 in the chamber of compartment 38 to await its next operation.

Figure 5:
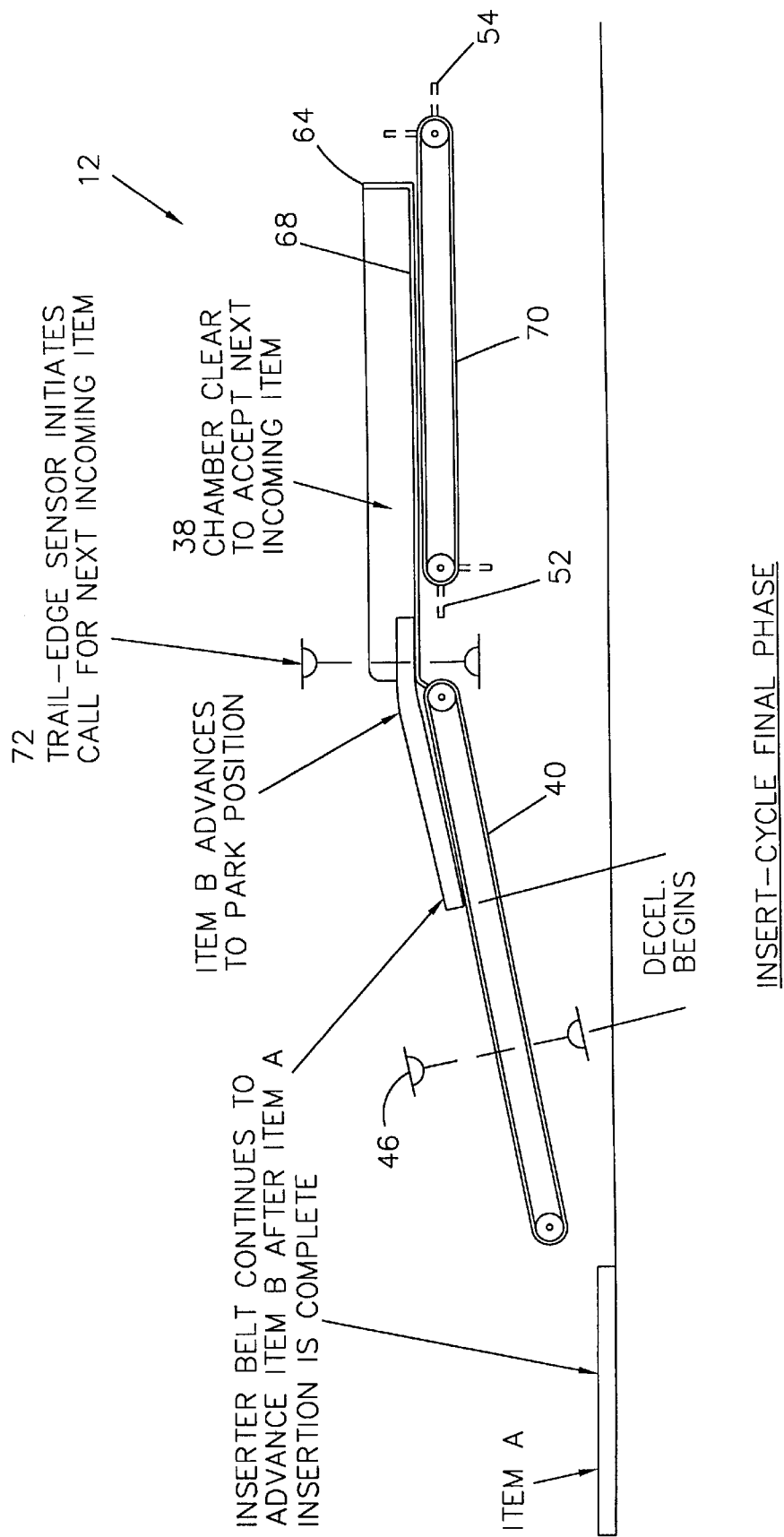

Situated directly behind vertical wall 64 of compartment 38 are a series of pusher fingers 52 which are interconnected to act in unison when activated. FIGS. 3–5 show a general sequence of transfer and insertion flow. The pusher fingers 52 become activated when the command signal is generated by controller 62, calling for the initiation of a downstream insertion cycle. As the downstream item A is being inserted, the space on the inserter belt 40 becomes available to receive its next occupant. In parallel with this insertion action of belt 40 is the action of the pusher fingers 52 in compartment 38. Fingers 52 advance to engage the trailing edge of the item B on transfer bed 68 in the chamber of compartment 38, accelerating and moving the item B a known distance which ensures that the item's advance continues under the influence of inserter belt 40 which is then also in motion. Once transfer of the item B to belt 40 is thereby assured, pusher fingers 52 decelerate and come to rest, leaving the chamber of compartment 38 clear to receive the next incoming mail piece C. A sensor 46, positioned to detect the trailing edge of the departing mail piece B on transfer bed 68 in the chamber of compartment 38, causes controller 62 to initiate the advance of the next item C in the buffered line-up to enter the chamber of compartment 38 after that compartment has been cleared of any obstructions such as fingers 52 or the departing mail piece B.

A mail piece B entering onto the surface of inserter belt 40 from transfer compartment 38 continues its advance under the control of inserter belt 40. Even after an insertion cycle has been completed, the inserter belt 40 continues to advance until the leading edge of its new occupant B has advanced to the ready-to-load park position. This location or position is predetermined based on the velocity of the distribution conveyor 36 and the desired acceleration rate for making a timely and precise insertion onto that conveyor; an example is given below.

The insertion cycle is initiated as follows. As the distribution conveyor 36 continues its advance from station 12 towards station 14, a sensor 66 monitoring the movement of conveyor 36 detects the presence of a vacancy zone on conveyor 36. At the appropriate time of arrival of the detected vacancy at a predetermined location at station 14, the insertion command is initiated by controller 62 to begin the process of merging the item at station 14 with the detected vacancy on the distribution conveyor 36.

There are other more sophisticated means of tracking vacancies which could be employed that need no sensors such as sensor 66 to monitor the position of the vacant zone on the distribution conveyor 36. For example, when an insertion is performed at an upstream station, that insertion is followed by a time delay to create a vacant zone which corresponds with the size of the next downstream insertion to be made. Initiation of the insertion cycle can alternatively serve to begin a timing clock in controller 62 which, because conveyor and insertion velocities and positions are known, monitors the amount of elapsed time which must pass before the vacant slot reaches its downstream receiving point at station 14. As a result, a properly synchronized time delay can be provided after which the insertion command in station 14 is initiated. This ensures timely and precise insertion of downstream mail onto the available vacancy on the conveyor 36.

In FIG. 2, the insertion mechanism 12 is shown in its ready-to-load state and contains a mail piece B whose leading edge is in the parked position shown in FIG. 2, awaiting a command to initiate a load cycle. In the preferred embodiment, one minor exception to this is shown for mail pieces which are less than 5 inches wide. Such mail flats are treated as though they are also 5 inches wide and as such, become aligned with the trailing edge of 5 inch wide flats when they are in the park mode. For all mail pieces 5 inches wide and less then, the command for an insertion cycle from controller 62 is initiated at exactly the same preassigned point in time. This is provided only as a means of avoiding a minor and unnecessary delay in the arrival at the parked position of all mail which is below 5 inches in width. A delay in arrival could then produce an equal insertion delay on the load belt 40, resulting in a minor, but avoidable loss in throughput.

The operation of the inserter belt system of FIG. 2 is as follows. With any size mail flat parked at the ready-to-load position on the inserter belt 40, belt 40 awaits a command from controller 62 for a load cycle. Prior to loading, the size of the mail piece has been pre-measured by array 24 during the induction of that mail piece into station 12, in order to allocate a space on the load belt 36 which will accommodate the mail flat plus a pre-established 7 inch gap to be used between mail pieces. Such measuring and allocation ensures a high packing density of mail in transit on belt 36 and a substantially reduced minimum transport speed necessary to sustain desired throughput levels. The command signal is initiated by controller 62 as a function of the space allocation on the load belt 36 and the advance of that space allocation towards its rendezvous with the mail piece A on the inserter belt 40. At a predetermined point in the advance of that space allocation on belt 36, the insert command is generated by controller 62. When the insert command is given by controller 62, the mail piece A is accelerated to achieve a final velocity whose vector matches a pre-established (e.g. 48 inches per second) velocity of the load belt 36. At a selected point beyond where the inserter belt 40 velocity and the load belt 36 velocity match, the lead edge of the mail piece A is in synchronism with the space allocation on the load belt 36, and the transfer of the mail flat from station 12 to belt 36 is completed.

When the mail piece A has been deposited on the load belt 36, the inserter belt 40 continues to run at its assigned peak velocity. This permits the next oncoming mail piece B from compartment 38 of station 12 to continue its advance onto the inserter belt 40. At the appropriate time, based on the measured size of the oncoming mail flat B, the inserter belt 40 begins to decelerate, delivering the mail piece B to its park position defined by sensor 46, ready for the next insert command from controller 62.

To ensure that the mail piece A is accurately deposited on the load belt 36, two conditions are satisfied. First, a signal from controller 62 to initiate an insertion cycle is provided which is regulated and properly timed with an oncoming assigned slot on the load belt 36. This ensures that a synchronous merge between the mail flat and the assigned slot on belt 36 is effected. Second, the effect of the acceleration force produced by the inserter belt 40 on the mail piece, and the friction between the mail piece and the inserter belt 40, is considered in order to avoid relative motion (e.g. slip) between the belt 40 and the mail piece. Experience with U.S. Mail handling characteristics has found that the static coefficient of friction between the mail and conveying belt materials can vary considerably, from 0.34 to 0.80. Assuming a worst case frictional coefficient of 0.34 between the mail piece and a conveyor belt 40, the maximum acceleration force that can be applied on the mail piece without causing it to slip on belt 40 can then be established. Using a mail flat weighing for example one pound, $F_{max}=f(N)=0.34 \times 1$ pound=0.34 pound, where N=the normal force on the belt provided by the mail flat. To ensure that the force of acceleration never exceeds this value of 0.34 pounds, a lesser force of, for example, 0.30 pounds can be used as the maximum allowable accelerating force to be applied for moving such mail. Again assuming a one pound mail flat, the rate of acceleration a can then be determined as a=Fg/w=(0.3 pound×386 in./sec$^2$)/1 pound=115.8 in./sec$^2$=0.3 g's. This maximum acceleration rate can then be used over the full spectrum of flat mail being handled by station 12 to ensure positive, non-slip movement of such mail.

As illustrated in FIG. 2, a transfer station compartment 38 is positioned upstream of the inserter belt system 40. The function of this compartment 38 is to accept, hold and deliver the next mail piece C to the inserter belt 40 when it is called for by controller 62. The compartment 38 receives individual mail pieces from its own input feed supply line 16, 18, and upon a command signal from controller 62, such a mail piece is redirected 90 degrees, in compartment 38 by fingers 52, to the inserter belt 40.

Transfer station 12 includes a low friction bed 68 which accepts and confines the mail piece C as it comes to rest on the surface 68 of compartment 38. A row of pusher fingers 52, located just outside of the compartment's side wall 64, are in position to advance and deliver the mail piece C to the inserter belt system 40 when it is required.

As described above, inserter belt 40 (and for example inserter belt 44) is accelerated to a final velocity similar or identical to that of load belt 36 (48 inches per second for this example) in order to deposit a mail flat A onto the load belt 36, and the inserter belt 40 continues to run at this velocity until it receives the next mail flat B to be processed. When a signal is generated by controller 62 calling for delivery of a mail flat to the inserter belt 40, the pusher fingers 52 enter the transfer bed 68 and engage the trailing edge of the mail piece B, accelerating it to the pre-established velocity discussed above. The inserter belt 40, which as stated earlier is already moving at that same velocity, takes over control of mail piece advancement while the pusher fingers 52 begin to decelerate as they exit compartment 38. The bed 68 is then fully vacated and ready to accept the next incoming mail flat C, which would be engaged by the next set of fingers 54.

To illustrate one example of the transfer of a full spectrum of flat mail in a timely manner in accordance with the present invention, several operating parameters are now assumed, consistent with the parameters normally expected for a sorting machine for small mail flats. The transfer station compartment 38 is preferably sized to accept a full spectrum of flat mail. Regardless of size however, one edge of flats entering the compartment 38 will always park within a fixed, relatively short distance (for example, 4 inches) from the side wall 64 of the compartment 38, bounding one edge of the bed 68 where the pusher fingers 52 emerge to engage the mail. This edge is used to square and accelerate the mail piece out of the transfer chamber 38. Back wall 65, bounding another edge of transfer bed 68 adjacent to wall 64, serves to ensure that belts 16 and 18 do not cause the mail piece entering compartment 38 to extend beyond compartment 38 in the direction of such insertion. For this analysis, it is assumed that a transfer command for compartment 38 is coincident with the inserter command from controller 62 calling for delivery of mail onto the load belt 36. When a transfer command is initiated by controller 62, the pusher fingers 52 enter the chamber 38, accelerating at a 0.3 g rate to a final velocity of (for this example) 48 inches per second (discussed above) over a distance of 10 inches. The time expended for this 10 inch advance is therefore 0.41 seconds. During this 0.41 second acceleration interval, contact with the trailing edge of the mail piece is made using fingers 52, so the acceleration of that mail piece is also assured. Assuming that the mail piece is parked in compartment 38 so that its trailing edge is just at the side wall 64 bounding one edge of the bed 68 where the fingers 52 emerge, immediate contact with and thus movement of the mail piece will result. If the edge of the mail is, for example, 4 inches from the side wall 64, some delay will exist before the fingers 52 contact the mail piece, so that a momentary impact between the pusher fingers 52 and the mail piece will occur as contact is made. Assuming a pusher finger 52 movement of 4 inches at the assumed acceleration rate of 0.3 g before contact with the mail piece is made by fingers 52, the pusher fingers 52 will produce a maximum impact velocity of only 15 inches per second when they contact the mail piece. When the pusher fingers 52 have advanced 10 inches into the transfer bed 68 of compartment 38 and the velocity of the mail piece they control has reached the previously set desired speed of (for example) 48 inches per second, the fingers 52 begin to decelerate and retract from the bed 68 of chamber 38. At the same time the inserter belt 40, which is running at the same speed of (for this example) 48 inches per second, takes over control of the advancing mail piece and (responsive to controller 62) begins a "decelerate and park" cycle timed to bring the mail flat to rest in the ready-to-load position on the belt 40 shown in FIG. 2. The corresponding deceleration command from controller 62 for this purpose is timed to occur as a function of the pre-measured (by array 24) size of the mail piece then being delivered from the compartment 38 to the inserter belt 40.

To satisfy the timing required for another mail flat to make its entry into the transfer station 12 compartment 38, a signal relating to the motion, or arrival on inserter belt 40, of a mail flat B exiting the transfer station 12 is provided. This signal is delayed sufficiently to ensure that both the departing mail flat B and the pusher fingers 52 will have ample time to vacate the transfer bed 68. This delay can be realized by providing this signal coincident with the command from controller 62 to begin pusher finger 52 deceleration. At that point in time, the trailing edge of a mail flat B exiting compartment 38 is still 5 inches within the transfer bed 68 of compartment 38. Using the transfer and insert configurations discussed above and shown in FIG. 2, the worst case exit time to leave transfer station 12 compartment 38 is based on the size (i.e. the width) of the exiting mail flat B. If that width is below 15 inches, then the mail flat will continue to advance at 48 inches per second for a time interval which is based on the measured size of the mail flat. However, if the mail flat is 15 inches wide, then deceleration will begin immediately and as such, will take the longest amount of time to vacate the transfer bed 68. Under this circumstance, and employing a deceleration rate of 0.3 g's over a 5 inch distance, the time required for the mail piece to vacate the transfer bed 68 is then 0.29 seconds. The signal from controller 62 to deliver the next mail piece C into the transfer station 12 compartment 38 then can be coincident with the deceleration command of controller 62 to the pusher fingers 52 so long as the leading edge of the incoming mail flat C does not make its entry into the chamber of compartment 38 in less than 0.29 second. This can be assured by simply positioning the leading edge of the mail piece which is to enter the transfer station 12 compartment 38 approximately 5 inches from the entrance to that compartment.

FIG. 3 shows a transfer chamber 38 and its associated inserter belt 40 in the ready-to-insert state of that station 12. As shown in FIG. 3, mail piece A is disposed in its ready-to-load park position on belt 40 defined by sensor 46, while upstream mail piece or other item B is in transfer compartment or chamber 38 at a park position of 0 inches to 4 inches from side wall 64. Pusher fingers 52 are disposed near wall 64 just outside compartment 38. Pusher fingers 52 and 54 are moved by motorized pusher finger transfer mechanism (e.g. a motorized chain or belt) 70. The next stage of operation of compartment 38 and belt 40 is shown in FIG. 4. In FIG. 4, items A and B accelerate in advance essentially simultaneously. Mail piece A is so moved by inserter belt 40. Mail piece B, having been moved by fingers 52, is now being also moved by belt 40. FIG. 4 shows an insertion cycle in process. The next stage of operation is shown in FIG. 5. In FIG. 5, inserter belt 40 continues to advance item B after insertion of item A onto belt 36 is complete. Item B is thereby advanced to the park position on belt 40 defined by sensor 46. A trailing edge sensor 72 in compartment 38 initiates a call for the next incoming item C, since sensor 72 has determined that chamber or compartment 38 is now clear to accept the next incoming item. Meanwhile, mechanism 70 moves fingers 52 out of compartment 38, and positions oppositely disposed fingers 54 into position just outside compartment 38 near wall 64. The combination of no item being sensed by sensor 46, and no item being sensed by sensor 72, also causes controller 62 to instruct belt 40 to begin decelerating so that item B will stop at the park position on belt 40 defined by sensor 46.

Control can be provided to the insertion mechanism of FIG. 2 by an external pulsed signal provided to that mechanism. One or more photocells can be used to sense or identify the position of an article, particularly in certain critical locations, to indicate that an article is available for induction into or further movement by the mechanism of FIG. 2. One or more other photocells can be used to sense or identify the location of one or more articles on conveyor 36, particularly in certain critical locations, or conversely to identify or locate a vacancy on conveyor 36. Conveyor 36 preferably moves at a constant speed, so that controller 62 can predict when an article, or a vacancy, will arrive at the output of a buffer and insertion station 12, 14, etc. Controller 62 can thus control when a buffer and insertion station 12, 14, etc. would provide an article to conveyor 36. If the size of such an article or vacancy upstream on conveyor 36 is measured, then controller 62 can more accurately control such operation of each buffer and insertion station.

Figure 1A:
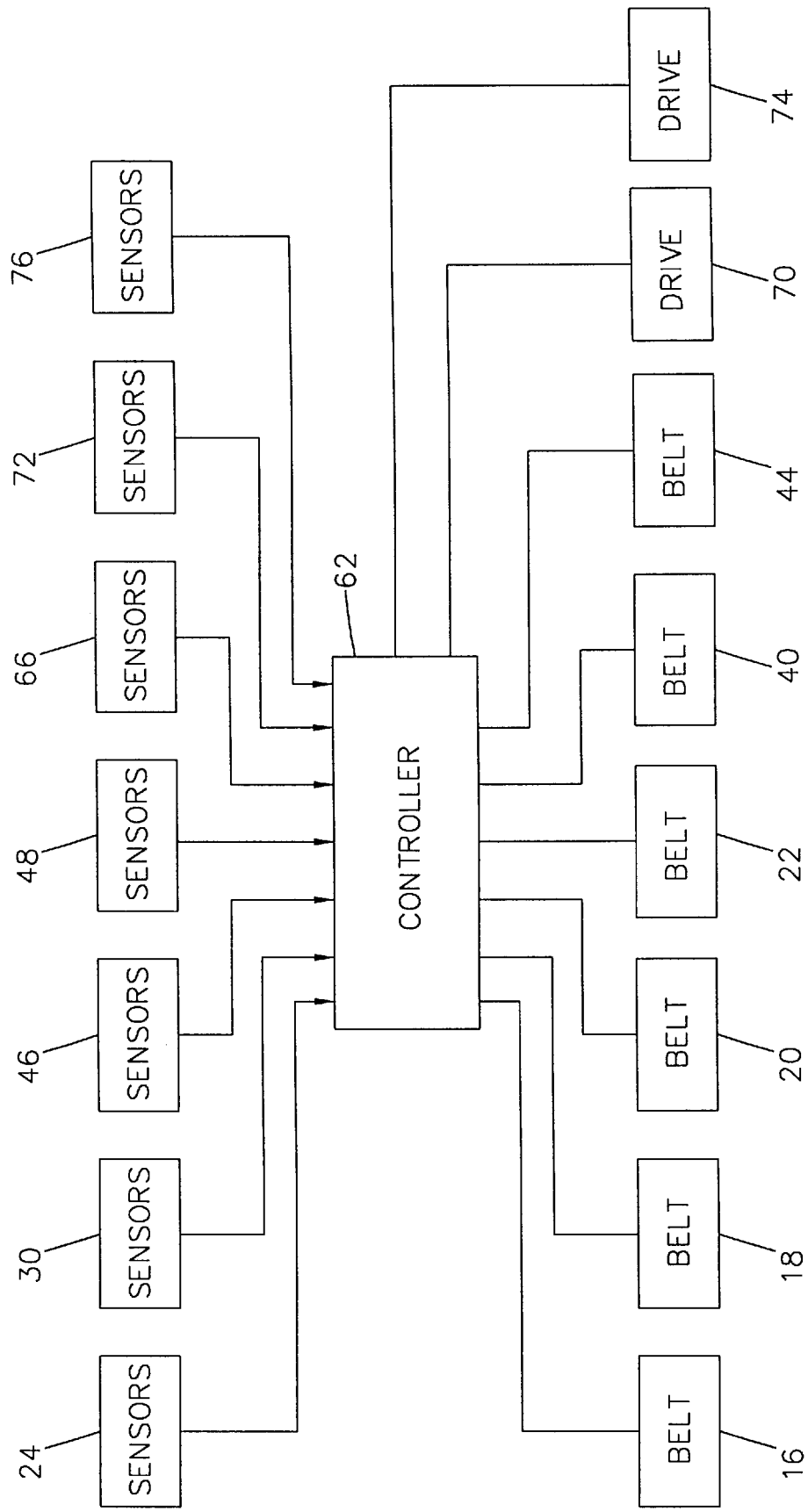
FIG. 1A is a simplified block diagram of control structure for the system of FIG. 1.

It is preferred that the control system of FIG. 1A be an electrical or electronic control system. However, hydraulics, pneumatics or fluidics could be used instead for this purpose.

It should be understood that, although illustrative dimensions, velocities, durations, etc. are given above, and may be preferred, the present invention can be operated with other such dimensions, velocities, durations, etc.

Some of the many advantages of the invention should now be readily apparent. For example, a novel transfer buffer and inserter has been provided which provides a means of receiving and positioning individual pieces of flat mail or other articles in preparation for precise insertion onto available and vacant "slots" of a moving conveyor system. The present invention thereby maximizes the packing density of mail pieces being loaded on a transport conveyor, and fully utilizes all of the available space allocated on that conveyor for transporting mail. This advantage permits the equipment to be operated at lower speeds without sacrificing throughput performance and with the resulting benefit of improved operating productivity. A highly precise insertion mechanism is also thereby provided. When a multiplicity of such buffer inserter devices are employed in a system, they allow parallel loading of a single transport conveyor while maintaining an ability of fully utilizing all of the available space allocations which exist on the conveyor. This technique reduces transport velocities of a conveyor system while maintaining its throughput performance. Slower transport speeds in turn reduce downtime and the incidences of jams, to thereby raise equipment productivity and operating efficiency. Such apparatus and method can accommodate varying sizes of items to be transferred. The precise insertion and deposit of individual items onto a moving conveyor is thereby provided. The present invention is not restricted by required mass/area ratios. It accommodates an ability to transfer items on completely asynchronous pitch distances. A minimum "window" length is pre-assigned in which merging is accomplished. Handling of a variation of sizes, and the ability to pre-assign space allocations, are provided. Such apparatus and method are able to consistently move items regardless of changes in friction levels, and is furthermore capable of merging a multiplicity of insertion stations onto a common conveyor, fully utilizing all or nearly all of the conveying surface of that conveyor. Such apparatus and method is completely asynchronous and is capable of loading items where vacancies exist on the conveyor system. Merging of items into a single controlled flow line of items is provided.

Precise insertion in the present invention is produced by generating a command signal which initiates the insertion cycle at the correct interval in time to fill the unoccupied available space on the transport conveyor. The timing of that insertion is determined by upstream monitors and size detection devices which serve to compare the mail pieces in queue and to reserve space allocations for their merger. This feature fully utilizes all of the space available on the conveyor while allowing the velocity of that conveyor to be lowered to maximize processing performance. Precise insertion is further assured by ensuring that insertion acceleration forces never exceed resistant frictional forces between the mail pieces and the insertion belt so that slippage therebetween does not occur. The present invention allows for fully asynchronous, real-time window sizing and allocations. However, the present invention can be used synchronously or asynchronously.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. An article delivery system, comprising:
   a first nonmovable surface;
   first means for delivering one or more articles to said first surface;
   first measuring means for measuring the length of an article in a first direction while the article is being delivered by said first delivering means to said first surface;
   first moving means for moving an article, when disposed on said first surface, off said first surface in the first direction;
   a first conveyor separate from said first surface disposed to receive and convey in the first direction an article being removed from said first surface by said first moving means;
   a second conveyor disposed to receive and convey in the first direction an article from said first conveyor;

a second nonmovable surface;

second means for delivering one or more articles to said second surface;

second measuring means for measuring the length of an article in the first direction while the article is being delivered by said second delivering means to said second surface;

second moving means for moving an article, when disposed on said second surface, off said second surface in the first direction; and a third conveyor disposed to receive and convey in the first direction an article from said second surface to said second conveyor downstream along said second conveyor from said first conveyor, wherein said second conveyor is also disposed to receive and convey in the first direction an article from said third conveyor, and controller means, responsive to said first measuring means and said second measuring means, for controlling operation of said first delivering means, said second delivering means, said first moving means, said second moving means, said first conveyor and said third conveyor such that two articles are deposited on said second conveyor from said first conveyor separated by a distance of at least but not substantially more than the length in the first direction of an article to be deposited between those two articles on said second conveyor from said third conveyor plus twice a constant predetermined minimum spacing, such that any articles provided to said second conveyor by said third conveyor do not overlap any articles provided to said second conveyor by said first conveyor.

2. An article delivery system comprising:

a first nonmovable surface;

first means for delivering one or more articles to said first surface;

first measuring means for measuring the length of an article in a first direction while the article is being delivered by said first delivering means to said first surface;

first moving means for moving an article, when disposed on said first surface, off said first surface in the first direction;

a first conveyor separate from said first surface disposed to receive and convey in the first direction an article being removed from said first surface by said first moving means;

a second conveyor disposed to receive and convey in the first direction an article from said first conveyor;

a second nonmovable surface;

second means for delivering one or more articles to said second surface;

second measuring means for measuring the length of an article in the first direction while the article is being delivered by said second delivering means to said second surface;

second moving means for moving an article, when disposed on said second surface, off said second surface in the first direction; and a third conveyor disposed to receive and convey in the first direction an article from said second surface to said second conveyor downstream along said second conveyor from said first conveyor, wherein said second conveyor is also disposed to receive and convey in the first direction an article from said third conveyor;

a first sensor for indicating whether an article is present at a first location on said first conveyor;

a second sensor for indicating whether an article is present on said second conveyor at a second location upstream of said first conveyor and said third conveyor;

a third sensor for indicating whether an article is present at a third location on said third conveyor; and controller means, responsive to said first measuring means, said second measuring means, said first sensor, said second sensor and said third sensor, for controlling operation of said first delivering means, said second delivering means, said first moving means, said second moving means, said first conveyor and said third conveyor such that two articles are deposited on said second conveyor from said first conveyor separated by a distance of at least but not substantially more than the length in the first direction of an article to be deposited between those two articles on said second conveyor from said third conveyor plus twice a constant predetermined minimum spacing, such that any articles provided to said second conveyor by said third conveyor do not overlap any articles provided to said second conveyor by said first conveyor or upstream of said first and second conveyors.

3. A method for providing one or more articles to a conveyor moving in a first direction, comprising the steps of:

first moving an article to a first nonmovable surface:

during said first moving step, first measuring the length of the article in the first direction;

after said first moving step, first removing the article from the first surface in the first direction;

after said first moving step, first delivering the article to the moving conveyor spaced apart from said first surface;

at any time, second moving another article to a second nonmovable surface;

during said second moving step, second measuring the length of the other article in the first direction;

after said second moving step, second removing the other article from the second surface in the first direction; and after said second removing step, second delivering the other article to the moving conveyor spaced apart from said second surface;

using responsively said first measuring step and said second measuring step for controlling operation of said first and second moving steps, said first and second removing steps and the operation of said moving conveyor such that two articles are capable of being deposited on said moving conveyor as a result of said first removing step separated by a distance of at least but not substantially more than the length in the first direction of an article to be deposited between those two articles on said moving conveyor as the result of said second removing step plus twice a constant predetermined minimum spacing, such that any articles provided to said moving conveyor by said second removing step do not overlap any articles provided to said moving conveyor by said first removing step.

4. An article delivery system, comprising:

a first surface;

first means for delivering one or more articles to said first surface;

first measuring means for measuring the length of an article in a first direction while the article is being delivered by said first delivering means to said first surface;

first moving means for moving an article, when disposed on said first surface, off said first surface in the first direction;

a first conveyor disposed to receive and convey in the first direction an article being removed from said first surface by said first moving means;

a second conveyor disposed to receive and convey in the first direction an article from said first conveyor;

a second surface;

second means for delivering one or more articles to said second surface;

second measuring means for measuring the length of an article in the first direction while the article is being delivered by said second delivering means to said second surface;

second moving means for moving an article, when disposed on said second surface, off said second surface in the first direction;

a third conveyor disposed to receive and convey in the first direction an article from said second surface to said second conveyor downstream along said second conveyor from said first conveyor; and controller means, responsive to said first measuring means and said second measuring means, for controlling operation of said first delivering means, said second delivering means, said first moving means, said second moving means, said first conveyor and said third conveyor such that two articles are deposited on said second conveyor from said first conveyor separated by a distance of at least but not substantially more than the length in the first direction of an article to be deposited between those two articles on said second conveyor from said third conveyor plus twice a constant predetermined minimum spacing, such that any articles provided to said second conveyor by said third conveyor do not overlap any articles provided to said second conveyor by said first conveyor and at least the constant minimum spacing is provided between articles on the second conveyor.

5. An article delivery system, comprising:

a first surface;

first means for delivering one or more articles to said first surface;

first measuring means for measuring the length of an article in a first direction while the article is being delivered by said first delivering means to said first surface;

first moving means for moving an article, when disposed on said first surface, off said first surface in the first direction;

a first conveyor disposed to receive and convey in the first direction an article being removed from said first surface by said first moving means;

a second conveyor disposed to receive and convey in the first direction an article from said first conveyor;

a second surface;

second means for delivering one or more articles to said second surface;

second measuring means for measuring the length of an article in the first direction while the article is being delivered by said second delivering means to said second surface;

second moving means for moving an article, when disposed on said second surface, off said second surface in the first direction;

a third conveyor disposed to receive and convey in the first direction an article from said second surface to said second conveyor downstream along said second conveyor from said first conveyor;

a first sensor for indicating whether an article is present at a first location on said first conveyor;

a second sensor for indicating whether an article is present on said second conveyor at a second location upstream of said first conveyor and said third conveyor.

6. An article delivery system as defined in claim 1 wherein said first moving means comprises a plurality of members for together pushing an article off said first surface in the first direction.

7. An article delivery system as defined in claim 2 wherein said first moving means comprises a plurality of members for together pushing an article off said first surface in the first direction.

8. An article delivery system as defined in claim 1 wherein:

said first moving means comprises a plurality of members for together pushing an article off said first surface in the first direction; and said second moving means comprises a plurality of members for together pushing an article off said second surface in the first direction.

9. An article delivery system as defined in claim 1 wherein:

said first moving means comprises a plurality of members for together pushing an article off said first surface in the first direction; and said second moving means comprises a plurality of members for together pushing an article off said second surface in the first direction.

10. An article delivery system as defined in claim 2 wherein:

said first moving means comprises a plurality of members for together pushing an article off said first surface in the first direction; and said second moving means comprises a plurality of members for together pushing an article off said second surface in the first direction.

11. A method as defined in claim 3 wherein said second delivering step comprises delivering the other article to the moving conveyor such that at least a constant minimum spacing is provided between articles on the moving conveyor.

* * * * *